United States Patent
Lien et al.

(10) Patent No.: US 11,814,905 B2
(45) Date of Patent: Nov. 14, 2023

(54) DRILLING RIG SYSTEMS AND METHODS

(71) Applicant: MHWIRTH AS, Kristiansand (NO)

(72) Inventors: Geir Lien, Hoevag (NO); Petter Mydland, Kristiansand S (NO)

(73) Assignee: MHWIRTH AS, Kristiansand (NO)

(*) Notice: Subject to any disclaimer, the term of this patent is extended or adjusted under 35 U.S.C. 154(b) by 0 days.

(21) Appl. No.: 17/277,300

(22) PCT Filed: Sep. 10, 2019

(86) PCT No.: PCT/NO2019/050179
§ 371 (c)(1),
(2) Date: Mar. 18, 2021

(87) PCT Pub. No.: WO2020/060415
PCT Pub. Date: Mar. 26, 2020

(65) Prior Publication Data
US 2021/0355758 A1     Nov. 18, 2021

(30) Foreign Application Priority Data
Sep. 20, 2018   (GB) .................................. 1815314

(51) Int. Cl.
| E21B 15/00 | (2006.01) |
| E21B 15/02 | (2006.01) |
| E21B 19/06 | (2006.01) |
| E21B 19/15 | (2006.01) |
| E21B 19/16 | (2006.01) |
| B25J 5/00 | (2006.01) |
| G05D 1/02 | (2020.01) |

(52) U.S. Cl.
CPC ............... *E21B 15/003* (2013.01); *B25J 5/00* (2013.01); *E21B 15/02* (2013.01); *E21B 19/06* (2013.01); *E21B 19/155* (2013.01); *E21B 19/165* (2013.01); *G05D 1/0276* (2013.01)

(58) Field of Classification Search
CPC ........ E21B 15/003; E21B 15/02; E21B 19/06; E21B 19/155; E21B 19/165; B25J 5/00; G05D 1/0276
USPC ..................................................... 166/75, 11
See application file for complete search history.

(56) References Cited

U.S. PATENT DOCUMENTS

| 3,876,255 | A | 4/1975 | Ilon |
| 8,079,426 | B2 | 12/2011 | Petersson |
| 10,745,985 | B2 * | 8/2020 | Miller .................... G05D 1/028 |
| 2004/0151549 | A1 | 8/2004 | Roodenburg et al. |

(Continued)

FOREIGN PATENT DOCUMENTS

| WO | WO 2004/035985 A1 | 4/2004 |
| WO | WO 2014/108541 A2 | 7/2014 |
| WO | WO 2018/213175 A1 | 11/2018 |

*Primary Examiner* — Matthew R Buck
*Assistant Examiner* — Patrick F Lambe
(74) *Attorney, Agent, or Firm* — Norman B. Thot

(57) ABSTRACT

A drilling rig system includes a drilling rig having a floor which is generally planar, and a utility vehicle having a base, a drive apparatus, and a ground engaging motive apparatus upon which the base is supported on the floor. The drive apparatus drives the ground engaging motive apparatus to move the utility vehicle across the floor. The ground engaging motive apparatus is drivable so as to change a direction of travel of the utility vehicle at any point on the floor.

14 Claims, 9 Drawing Sheets

(56) References Cited

U.S. PATENT DOCUMENTS

| | | | | |
|---|---|---|---|---|
| 2007/0181373 A1* | 8/2007 | Tygard | ................... | B66F 9/188 |
| | | | | 187/222 |
| 2015/0275596 A1* | 10/2015 | Hickie | ................. | E21B 19/165 |
| | | | | 166/380 |
| 2016/0201408 A1* | 7/2016 | Little | ..................... | E21B 19/14 |
| | | | | 414/730 |
| 2017/0321490 A1 | 11/2017 | Haavind | | |
| 2018/0334865 A1 | 11/2018 | Miller et al. | | |

\* cited by examiner

DRILLING RIG SYSTEMS AND METHODS

CROSS REFERENCE TO PRIOR APPLICATIONS

This application is a U.S. National Phase application under 35 U.S.C. § 371 of International Application No. PCT/NO2019/050179, filed on Sep. 10, 2019 and which claims benefit to Great Britain Patent Application No. GB 1815314.8, filed on Sep. 20, 2018. The International Application was published in English on Mar. 26, 2020 as WO 2020/060415 A1 under PCT Article 21(2).

FIELD

The present invention relates to a drilling rig system comprising a drilling rig with a floor and a utility vehicle, the utility vehicle being usable to move supplies or equipment around the floor of the drilling rig.

BACKGROUND

US 2017/0321490 describes moving items around a rig floor using a plurality of skids which move along a network of rails provided on the rig floor. Each skid has rail engagement members which engage with at least one rail of the network of rails. The skids are provided with two cycling feet which are operable to grab the rails or engage with the rig floor in order to push or pull the skids along the rails. The network of rails comprises two mutually perpendicular sets of rails, and the two cycling feet are arranged to facilitate movement along two generally perpendicular sets of the rails. Other documents which may be useful for understanding the field of technology include WO 2018/213175 A1.

SUMMARY

An aspect of the present invention is to provide improved technology for carrying out operations on a drilling rig, including but not limited to moving items around a floor of a drilling rig.

In an embodiment, the present invention provides a drilling rig system which includes a drilling rig comprising a floor which is generally planar, and a utility vehicle comprising a base, a drive apparatus, and a ground engaging motive apparatus upon which the base is supported on the floor. The drive apparatus is configured to drive the ground engaging motive apparatus so as to move the utility vehicle across the floor. The ground engaging motive apparatus is configured to be drivable so as to change a direction of travel of the utility vehicle at any point on the floor.

BRIEF DESCRIPTION OF THE DRAWINGS

The present invention is described in greater detail below on the basis of embodiments and of the drawings in which.

DETAILED DESCRIPTION

Figure 1:
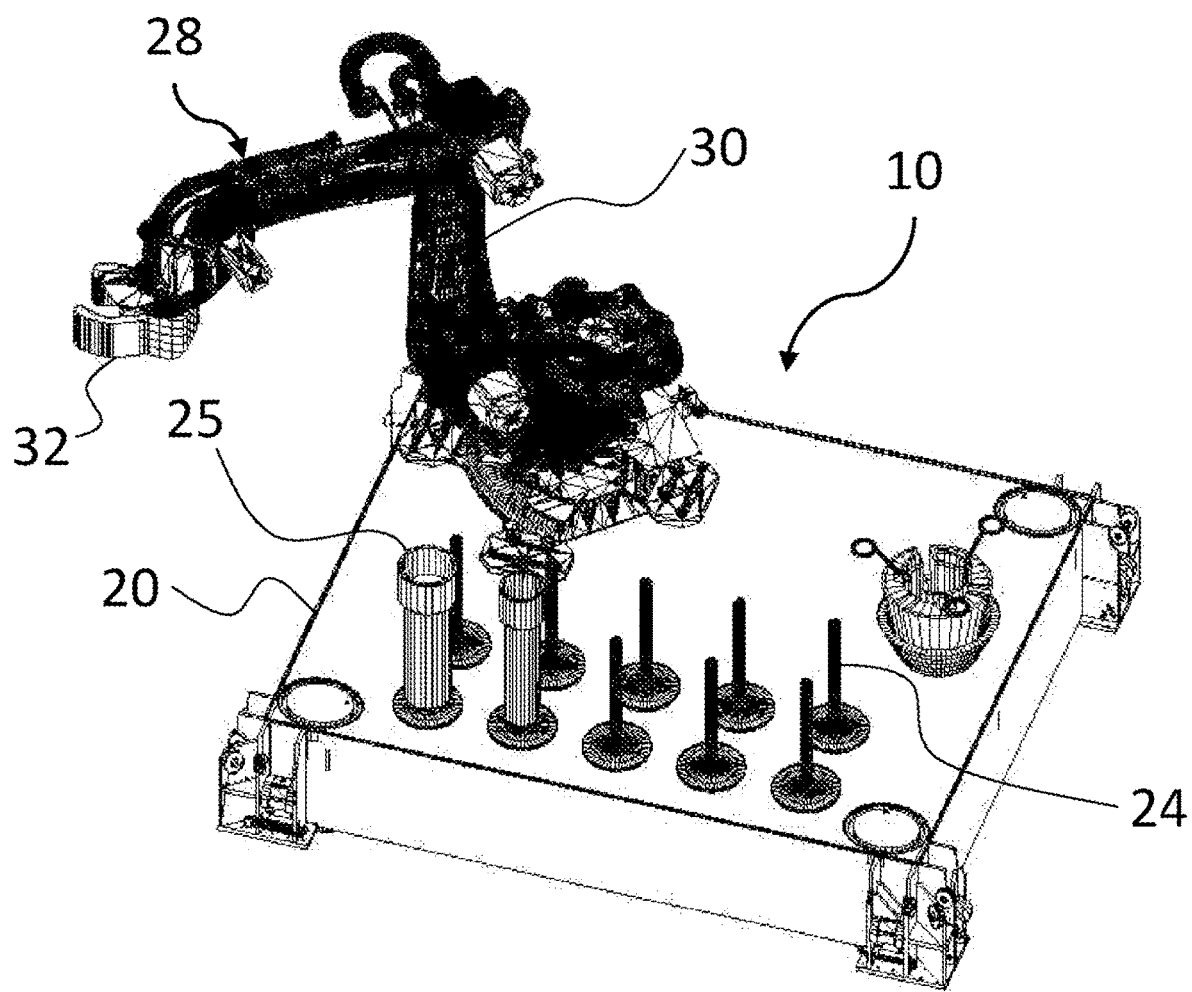
FIG. 1 is a perspective illustration (from above) of a utility vehicle suitable for use in a system according to the first aspect of the present invention.

A first aspect of the present invention provides a drilling rig system comprising a drilling rig with generally planar floor and a utility vehicle having a base, a drive apparatus and ground engaging motive apparatus upon which the base is supported on the floor, the drive apparatus being operable to drive the motive apparatus to move the vehicle across the floor.

The motive apparatus may be drivable to change the direction of travel of the utility vehicle at any point on the floor or configured to drive along pre-defined rails or tracks on the floor.

The ground engaging motive apparatus may comprise a plurality of wheels.

The wheels may be rotatable about a wheel axis which is generally parallel to the floor, at least some of the wheels being driven wheels, the drive apparatus being operable to drive the rotation of the driven wheel or wheels about its wheel axis.

The wheel axes may be pivotable about a pivot axis which is generally perpendicular to the floor, and the drive apparatus being operable to drive the pivoting of the driven wheel or wheels about its pivot axis, in order to move the utility vehicle in any desired direction across the floor.

The ground engaging motive apparatus may comprises at least two tracks, such as those used on mini-excavators.

The floor may be a rig floor or pipe deck of the drilling rig.

The drilling rig may be a floating drilling rig.

In an embodiment of the present invention, the drive apparatus comprises an electric motor and a battery which are both mounted on the base of the utility vehicle. The battery can in this case, for example, be rechargeable and the utility vehicle can, for example, be provided with a connection via which the battery may be re-charged. At least one charging station is advantageously provided on the floor so that, when the utility vehicle is positioned in the charging station, the connection is connected to a source of electrical power.

The motor may alternatively be powered by a fossil fuel such as diesel or petrol.

In an embodiment of the present invention, the utility vehicle has a wireless control signal receiver from which it may receive wireless control signals from a remote controller, the control signals controlling the operation of the drive apparatus.

In an embodiment of the present invention, the base has four sides, each side being generally perpendicular to the adjacent sides so as to form four corners, there being a wheel or set of wheels provided at each of the four corners of the base.

In an embodiment of the present invention, the base has a generally planar uppermost surface on which pieces of equipment may be placed. The base may in this case be provided with a plurality of poles or rods which are mounted on the planar uppermost surface of the base extending generally perpendicular to the planar uppermost surface of the base.

In an embodiment of the present invention, a powered apparatus is mounted on the base. The apparatus may be hydraulically or pneumatically powered, and includes a connector via which its hydraulic or pneumatic system may be connected to a source of hydraulic or pneumatic power provided on the floor.

The apparatus may be one of a pipe handler, a coiled tubing reel, a spider, an iron roughneck, a mud bucket, a low guarding arm, a drill flow manipulator arm, a multi-manipulator arm, a tubular feeding machine, a riser feeding arm, a casing feeder arm, a conveyor, a shuttle horizontal to vertical arm, a tail in arm, a tail in machine, a tubular transfer arm, a crane, a Christmas tree, a blowout preventer, and a mud or cement handling equipment.

In an embodiment of the present invention, the base of the utility vehicle is provided with at least one anchor formation via which an operator may secure the base to the base of one of more additional utility vehicles.

In an embodiment of the present invention, the floor is provided with at least one anchor point, and the system is further provided with an anchor which extends between the anchor point on the floor and the anchor formation on the base of the utility vehicle to secure the utility vehicle on the floor.

The utility vehicle may be provided with an anti-lift controller which includes at least one electronic sensor which is configured to detect pitch, roll and acceleration of the utility vehicle, the anti-lift controller being programmed with a pre-determined threshold level for the pitch, roll and/or acceleration of the utility vehicle.

The utility vehicle may be provided with a plurality of load sensors which measure the load at various points across the base, and the anti-lift controller may be connected to the load sensors and programmed to use the signals received from the load sensors to determine the load distribution over the base.

The anti-lift controller may be connected to a wireless signal receiver, and the drilling rig may be provided with a stability control system which includes sensors which measure the pitch, roll and/or acceleration of the drilling rig, or wind speed sensors, the anti-lift controller being programmed to receive data from theses sensors concerning the wind speed, and/or pitch, roll and acceleration of the drilling rig sent from the drilling rig's stability control system to the wireless signal receiver.

The anti-lift controller may, in this case, be programmed to use this additional information (load distribution, wind speed, drilling rig pitch, roll and acceleration data) to re-evaluate the threshold level continuously, or at least at regular intervals, during the operation of the utility vehicle.

The anti-lift controller may be programmed to issue a visible and/or audible alert if it detects pitch, roll or acceleration of the utility vehicle above the threshold level.

The anti-lift controller may be programmed to operate a lift preventer system if it detects pitch, roll or acceleration of the utility vehicle above the threshold level.

The lift preventer system may comprise an electromagnet which is mounted on the underside of the base of the utility vehicle, the anti-lift controller being programmed to increase the flow of electrical power to the electromagnet if the pitch, roll or acceleration of the utility vehicle exceeds the threshold level.

The lift preventer system may comprise anti-lift arms, the anti-lift controller being programmed to extend these arms from the base in a direction generally parallel to the plane of the base if it detects pitch, roll or acceleration above the threshold level.

The lift preventer system may comprise a counterweight balancing system which is mounted on a utility vehicle, the anti-lift controller being programmed to operate the counterweight balancing system to counteract the forces causing pitch, roll or acceleration of the utility vehicle above the threshold level.

The anti-lift controller may be connected to a wireless signal transmitter, and drilling rig may be provided with a stability control system which includes means to alter the pitch or roll of the drilling rig, the anti-lift controller being programmed to use the wireless signal transmitter to transmit control signals to the drilling rig's stability control system so as to cause the drilling rig's stability control system to operate to reduce the tilting of the floor.

Where a powered apparatus is mounted on the base, the anti-lift controller may be connected to an electronic equipment controller which controls the operation of the apparatus, and if it detects pitch, roll or acceleration of the utility vehicle above threshold level, to instruct the equipment controller to control the equipment in such a way as to lower the center of gravity of the utility vehicle and/or return the center of gravity to a point over the base.

A second aspect of the present invention provides an apparatus for joining two tubular elements including a pipe handler apparatus comprising a movable arm on which is mounted a gripper for holding a tubular element, and an alignment controller which is connected to a position sensor, the position sensor being configured to detect the position of an end of a first tubular element held in the gripper and the position of an end of a second tubular element into or onto which the first tubular element is to be placed.

The alignment controller may be programmed to provide a visual or audible signal to an operator when the end of the first tubular element and the end of the second tubular element are aligned.

The apparatus may further comprise an actuator or actuator assembly which is operable to move the arm, the alignment controller being connected to the actuator or actuator assembly and programmed to control the actuator or actuator assembly to move the end of the first tubular element into engagement with the end of the second tubular element when the alignment controller determines, from input signals from the position sensor, that the end of the first tubular assembly is aligned with the end of the second tubular assembly.

The apparatus may be mounted on a utility vehicle which is movable to bring the pipe handler into a desired position relative to the end of the second tubular element.

The apparatus may be mounted on a utility vehicle according to the first aspect of the present invention.

The alignment controller may be connected to a drive apparatus of the utility vehicle, the drive apparatus being operable to move the utility vehicle, the alignment controller being programmed to use input signals from the sensor and the drive apparatus to move the utility vehicle to bring the end of the first tubular element into a desired alignment with respect to the end of the second tubular element.

The sensor may be mounted on the utility vehicle.

The sensor may comprise a lidar, a radar or a camera system.

A third aspect of the present invention provides a drilling rig having a floor, and an apparatus for joining two tubular elements according to the second aspect of the present invention, the second tubular element being secured in a stationery position relative to the floor.

The second tubular element may extend through an aperture in the floor generally perpendicular to the floor.

The sensor may be mounted on a fixed structure on the floor.

A fourth aspect of the present invention provides a method of using a drilling rig system according to the first aspect of the present invention to move an elongate object over the floor, the method comprising supporting a first end of the elongate element on a first utility vehicle and a second, opposite end of the elongate element on a second, separate utility vehicle so a longitudinal axis of the elongate element is generally parallel to the floor, moving the first and second utility vehicles over the floor in unison to transport the elongate element to a desired position on the floor, at which point the first utility vehicle is located in a first end position and the second utility vehicle is in a second end position.

The method may further comprise, when the elongate element is in the desired position on the floor, using an elevator apparatus to lift the first end of the elongate element off the first utility vehicle, whilst simultaneously moving the second utility vehicle from the second end position towards the first end position, the second end of the elongate element still being supported by the second utility vehicle, in to order move the elongate element towards an upright position in which its longitudinal axis extends generally perpendicular to the floor.

The method may further comprise moving the first utility vehicle away from the first end position once the first end of the elongate element is no longer supported on the first utility vehicle.

The method may further comprise moving the second utility vehicle into the first end position, and then using the elevator to lift the elongate element off the second utility vehicle.

Embodiments of the present invention will now be described, by way of example only, under reference to the accompanying drawings.

Figure 2:
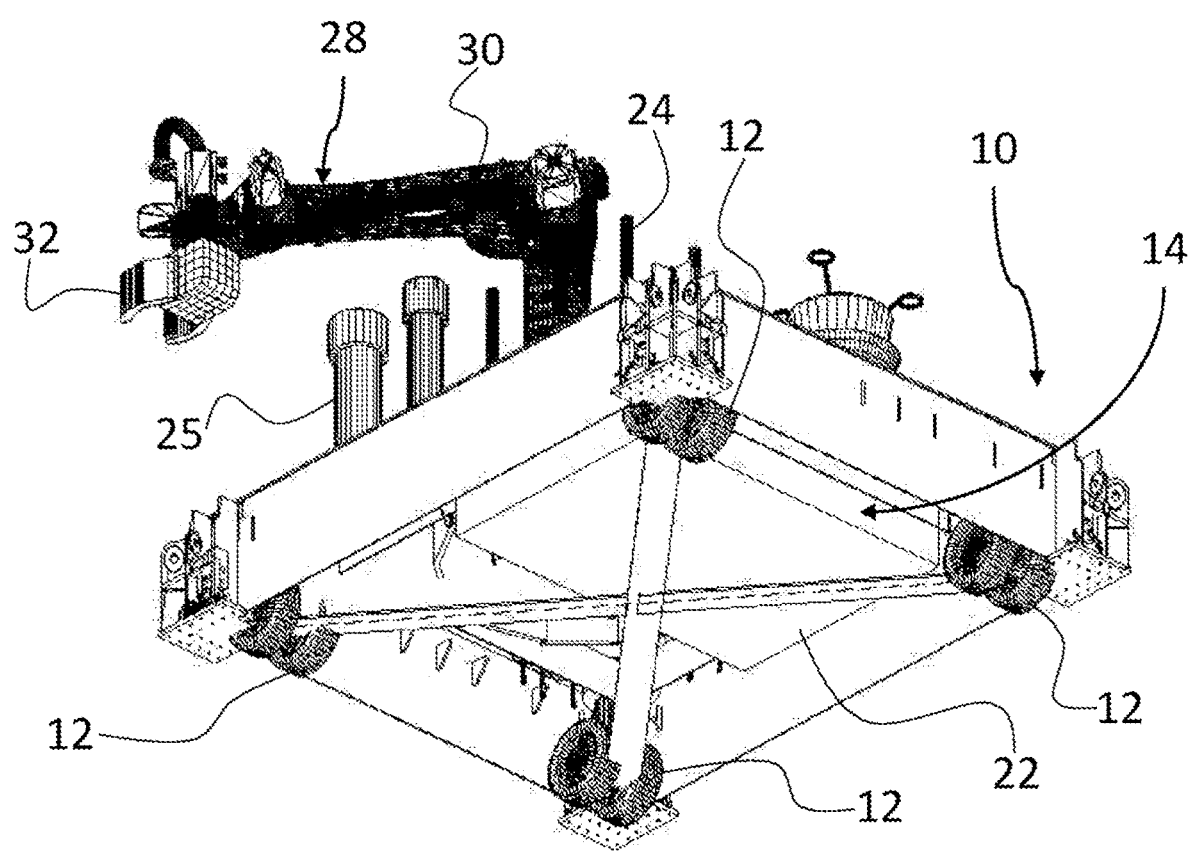
FIG. 2 is a perspective illustration of the underside of the utility vehicle illustrated in FIG. 1.
Figure 3:
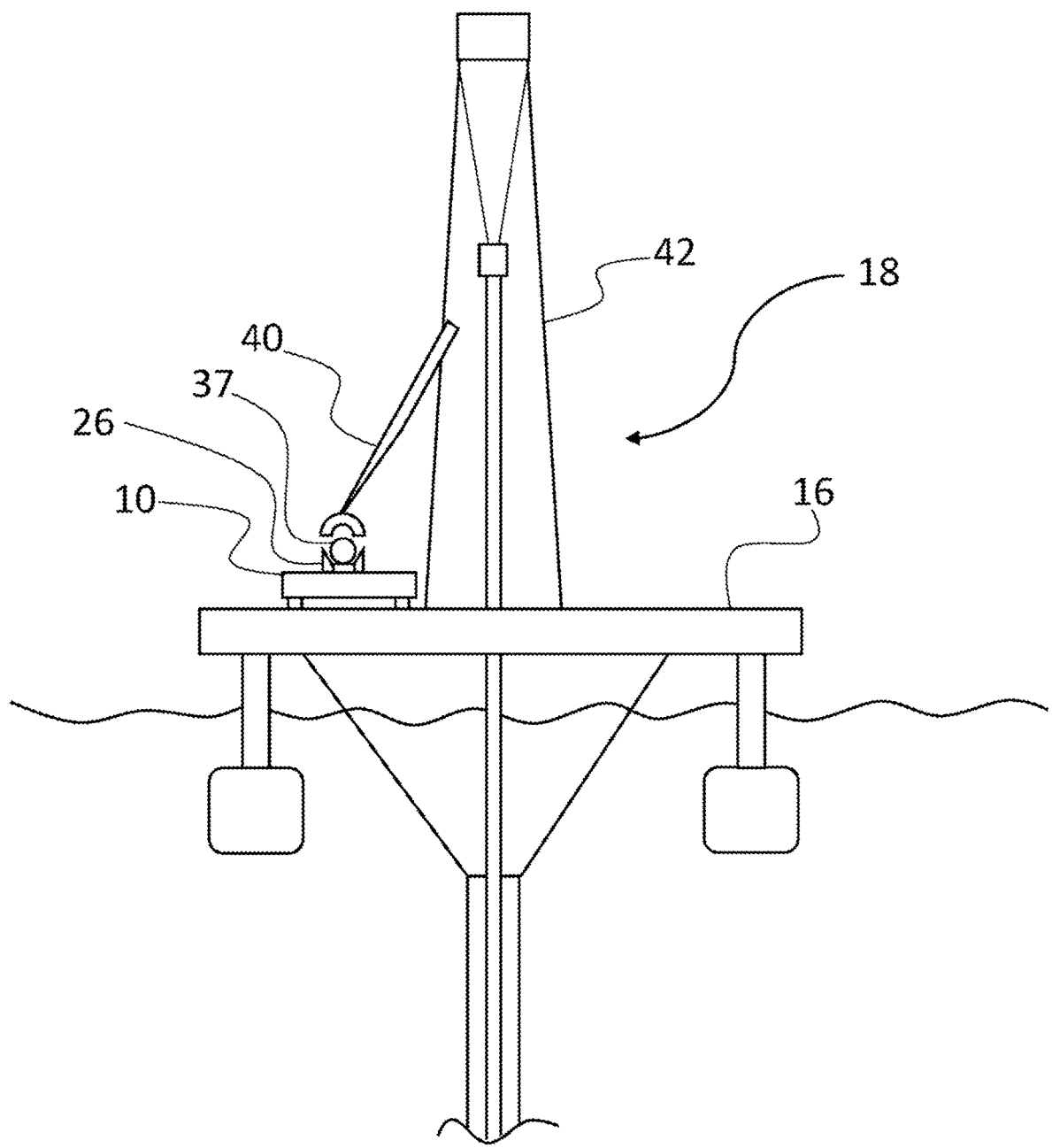
FIG. 3 is a schematic illustration (not to scale) of a drilling rig system according to the first aspect of the present invention, comprising a utility vehicle on a rig floor of a floating drilling rig.

Referring now to FIGS. 1 and 2, there is shown a utility vehicle 10, which has a ground engaging motive apparatus which is operable to move the utility vehicle 10 across the floor and to change the direction of travel of the utility vehicle 10 at any point on the floor. In this example, the motive apparatus comprises a plurality of wheels 12, the wheels 12 being configured to rest on and move over a generally planar surface, and a drive apparatus 14 which is operable to rotate all or some of the wheels 12 in order to move the utility vehicle 10. In the drilling system according to the present invention, the utility vehicle 10 is placed on the rig floor 16 of a drilling rig 18, as illustrated in FIG. 3, the rig floor 16 being generally flat. The wheels 12 are designed to move over a flat surface, not to engage with rails, so operation of the drive apparatus 14 causes the utility vehicle to move around the rig floor 16.

By providing the utility vehicle 10 with a ground engaging motive apparatus which does not run on a rails or a track, the utility vehicle 10 has complete freedom as to where it can move to on the rig floor 16, and the path it takes to get to a desired location. Removing the need to provide rails on the rig floor 16 may moreover be advantageous in improving the safety of personnel on the drilling rig by eliminating the possibility of a person on the rig floor 16 tripping over rails. It also avoids the complication of having to provide a rail system which facilitates the crossing of paths around the floor.

The wheels 12 advantageously have tires made from a material which has a sufficiently high coefficient of friction to grip the rig floor 16 as the utility vehicle 10 moves around. The wheels 12 may have pneumatic tires, or solid tires. Where the tires are solid, they are advantageously made from a resilient or elastomeric material which provides a degree of damping of vibrations as the utility vehicle 10 moves around.

The utility vehicle has a base 20, which in this embodiment of the present invention is planar and provides a generally flat surface on which equipment, machines or other apparatus may be placed for storage and/or transportation around the rig floor 16. In this example, the base 20 is square or rectangular, and has a pair of wheels 12 mounted at each corner. It will be appreciated, however, that it is not necessary for the wheels 12 to be at the corners of the vehicle 10, all that it required is that the wheels 12 be distributed around the base 20 of the vehicle 10 so that the base 20 is stable when supported on the wheels 12. The wheels 12 could moreover be provided singly, rather than in pairs, or in groups of more than two.

All the wheels 12 rotate about a wheel axis which is generally parallel to the plane of the base 20. In this embodiment of the present invention, in order for the utility vehicle 10 to have the ability to change its direction of travel at any point on the rig floor 16, the wheel axes are also pivotable about a pivot axis which is generally perpendicular to the plane of the base 20. This provides that the direction of travel of the wheels 12 is variable when they rotate about their wheel axis. The wheel axes are pivotable about the pivot axes through at least 90°. In an embodiment, the wheel axes of all of the wheels 12 can, for example, pivot through 360°, thus providing complete freedom in the direction of travel of the wheels 12.

In this embodiment, the drive apparatus 14 is operable to drive two of the four pairs of wheels 12, the non-driven wheels merely acting as followers. It is possible, however, that only one or all of the wheels 12 may be driven.

The drive apparatus 14 does not require a connection to anything external to the utility vehicle 10 in order to operate, so the utility vehicle 10 is self-propelled. In this embodiment, the drive apparatus 14 comprises an electric motor which is powered by a battery 22 which is mounted on the underside of the base 20. The battery 22 is rechargeable and is provided with a connection via which it may be recharged. At least one charging station is provided on the rig floor 16, and when the utility vehicle 10 is positioned in the charging station, the connection is connected to a source of electrical power. This could be a conventional wired connection, or a wireless connection, for example, using induction charging.

It will be appreciated, however, that the drive apparatus 14 could equally comprise any other sort of motor, including a motor powered by a fossil fuel such as diesel or petrol.

The drive apparatus 14 is configured to drive the rotation of the driven wheels 12 about their wheel axes, as well as the pivoting of each wheel axes about its pivot axis, in order to determine the direction of travel of the utility vehicle 10. The drive apparatus 14 has a wireless control signal receiver from which it may receive wireless control signals from a controller. The control signals control the operation of the drive apparatus, both the speed of rotation of the wheels 12 about their wheel axes, and the pivoting of the wheels 12. The controller may as such be used to drive the utility vehicle 10 around the floor, to whichever destination, and via whichever route an operator selects.

The control signals could be simple directional instructions, i.e., left, right, forward, or backwards, and the controller could be provided with user input device, such as a joystick or joysticks, to select what control signals are sent to the drive apparatus 14. An operator could thus use the controller to drive the utility vehicle along a non-predetermined path, as if driving a toy remote controlled car.

The controller could alternatively be pre-programmed with a pre-determined route to each of a selection of pre-determined destinations on the rig floor 16, and the user input device used to select which of the pre-determined destinations the utility vehicle 10 is to move to. The user input device could in this case be a keypad or touchscreen which are used to enter a location code or to select a location from a list. The controller could in this case be located on the utility vehicle 10, rather than being remote from the drive apparatus 14.

The controller could equally be programmed with a smart navigation system such as that used by autonomous vehicles in, for example, for collecting or picking goods in a warehouse. The utility vehicle 10 could, for example, be provided with sensors for detecting obstacles, and to use inputs from these sensors to determine its own path to the desired destination as it goes along. The controller could additionally be provided with a GPS sensor, and could receive locations signals from other utility vehicles active on the rig floor 16, and be programmed to use this information to plot a route to the desired destination without risk of colliding with another utility vehicle 10 en route.

In the embodiment of the present invention illustrated in FIGS. 1 and 2, a plurality of poles or rods 24 are mounted on the uppermost surface of the base 20, extending generally perpendicular to the plane of the base 20. Tubular items such as subs 25 may be placed on these rods for transportation around the rig floor 16, with the longitudinal axis of the sub 25 extending generally perpendicular to the plane of the base 20.

An alternative arrangement for holding tubular elements on a utility vehicle 10 comprises a plurality of U-shaped cradles 26 which are mounted on the base 20, each cradle 26 having two generally parallel arms extending generally perpendicular to the plane of the base 20. An elongate element such as a pipe or other tubular may be placed on the base 20 with its longitudinal axis extending generally parallel to the plane of the base 20, the elongate element being located in the cradle 26 between the two arms so as to prevent the elongate element from rolling around or off the base 20.

It will be appreciated that the present invention is not restricted to use with this particular arrangement for holding tubular items. Any other form of suitable racking or holding or support structure may be mounted on the base 20.

The embodiment of the present invention illustrated in FIGS. 1 and 2 also show that a hydraulically operated pipe handler 28 is mounted on the base 20. A proportion of the uppermost surface of the base 20 is empty to provide space for the storage or transportation of other items.

The pipe handler 28 comprises a movable articulated arm 30 with a grabber 32 at an end thereof, the grabber 32 being operable to grip items including tubulars such as sections of drill string. The articulated arm 30 is movable by a plurality of hydraulic rams, and the pipe handler 28 includes a connector via which these hydraulic rams may be connected to a source of hydraulic power provided on the rig floor 16. It will be appreciated that the articulated arm 30 can, however, be movable by other means. It can, for example, be pneumatically or electrically operated.

Figure 4:
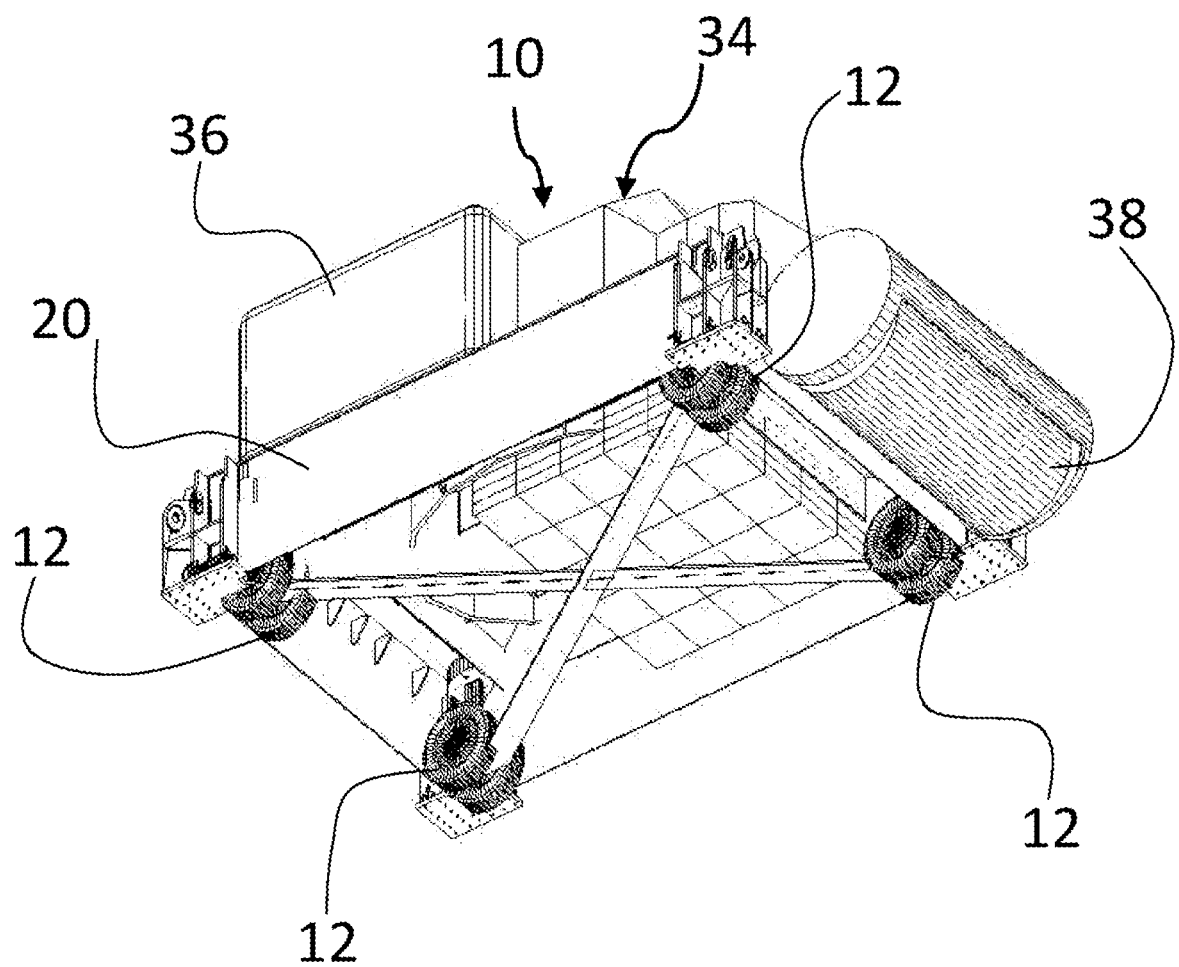
FIG. 4 is a perspective illustration of a utility vehicle having a deck washer mounted thereon.

An alternative embodiment of the utility vehicle 10 is illustrated in FIG. 4. In this case, a deck washer 34 is mounted on the base 20 of the utility vehicle 10. The deck washer 34 comprises a tank 36 of cleaning fluid such as water or a water and detergent mixture, a rotatable brush 38 which is suspended over an edge of the base 20 so that it may engage with the rig floor 16, a brush drive which is operable to rotate the brush 38, and a fluid conveying apparatus for directing cleaning fluid from the tank 36 onto the brush 38. The deck washer 34 may be used to clean the rig floor 16 by moving the utility vehicle 10 over the rig floor 16 as the brush drive is operated to rotate the brush 38 and the fluid conveying apparatus operated to direct cleaning fluid onto the brush 38.

It will be appreciated, however, that the present invention is not limited to use with a pipe handler 28 or deck washer 34, and various other pieces of equipment or apparatus may be mounted on the utility vehicle 10. These could include a coiled tubing reel, a spider, an iron roughneck, a mud bucket, a low guarding arm, a drill flow manipulator arm, a multi-manipulator arm, a tubular feeding machine, a riser feeding arm, a casing feeder arm, a conveyor, a shuttle horizontal to vertical arm, a tail in arm, a tail in machine, a tubular transfer arm, a crane, a Christmas tree, a blowout preventer, and mud or cement handling equipment.

Operation of a drilling rig 18 will never require all such items of equipment to be in operation simultaneously. It is as such not necessary to provide a utility vehicle 10 for every item of equipment; fewer utility vehicles 10 are required. The choice of which pieces of equipment are mounted on a utility vehicle 10 will depend on what operations are being carried out at the time, and the equipment on the utility vehicles 10 can be changed over as requirements change. This can result in savings in the cost, volume and weight of the equipment required to be stored on the drilling rig 18 in order to carry out the normal range of operations.

If a utility vehicle 10 is rigged with equipment which is required to be used continuously over a prolonged period of time, the battery 22 may run down whilst the equipment is still in use, making it impossible to return the utility vehicle 10 to a charging station to recharge the battery 22. Means may therefore be provided to recharge the battery 22 of one utility vehicle 10 from a different utility vehicle 10 with a fully charged battery. For example, each utility vehicle 10 may be provided with a power outlet from which power may be drawn from its battery 22, and a power inlet via which electrical power may be provided to recharge the battery, and an appropriate electrical cable used to connect the power outlet of the utility vehicle 10 with the charged battery to the power inlet of the utility vehicle 10 which requires charging.

When not in use, the utility vehicles 10 may be stored separately from this apparatus or items of equipment, the required equipment being mounted on a utility vehicle 10 only when it is required. The utility vehicles 10 may in this case be stacked one on top of the other in order to minimize the space they occupy on the drilling rig.

The floors of a drilling rig 18 often become extremely dirty during drilling, for example, being covered in drilling mud, and the utility vehicle 10, particularly its underside, will also become dirty. The drilling rig 18 may therefore be provided with utility vehicle washing stations which may, for example, comprise high pressure water jets directed upwards from the floor, and rotating brushes, which can be used to clean the underside of the utility vehicle 10.

By virtue of the fact that the utility vehicles 10 have complete freedom of movement over the drill floor or pipe deck, the machine and/or transported item may be moved to a work destination from any direction. The choice of route to a particular work destination, a stickup at the well center, for example, may be chosen according to the machine or equipment mounted on a utility vehicle 10 at the time. For example, when the utility vehicle 10 is carrying an iron roughneck, it may be more efficient for the utility vehicle 10 to approach the well center from the pipe-side V-door, but if the utility vehicle 10 is being used to run casing, it may be more appropriate to approach from the rise side V-door. Multiple utility vehicles 10 can be run at any one time along crossing paths, providing their movement is coordinated so that they are not attempting to cross paths at the same time.

Although the utility vehicle 10 described above has a generally square or rectangular base 20, this need not be the case. The base 20 may, for example, be generally U-shaped. This could be particularly advantageous when the utility vehicle 10 is used to carry an iron roughneck, as it would be possible to move the utility vehicle 10 so that its base partially surrounds the pipe joint the iron roughneck is to engage with.

An item of equipment may be mounted on two or more utility vehicles 10, the utility vehicles 10 being either connected together and moved in unison, or unconnected but moved in unison. This may be particularly advantageous in transporting an elongate element 37 such as a section of drill string, riser or casing, in which case a first end 37a of the elongate element 37 may be supported on a first utility vehicle 10a and a second end 37b of the elongate element 37 supported on a second utility vehicle 10b. A machine for lifting or moving the elongate element 37, such as a pipe handler, tubular feeding machine, riser feeding machine, or casing feeding machine, may be mounted on the first utility vehicle 10a to engage with the first end 37a of the elongate element 37, whilst the second end 37b merely rests on the second utility vehicle 10b. The utility vehicles 10a, 10b may then be moved in unison to bring the elongate element 37 into a desired work destination, before the handling equipment is operated to install the elongate element 37.

Figure 5:
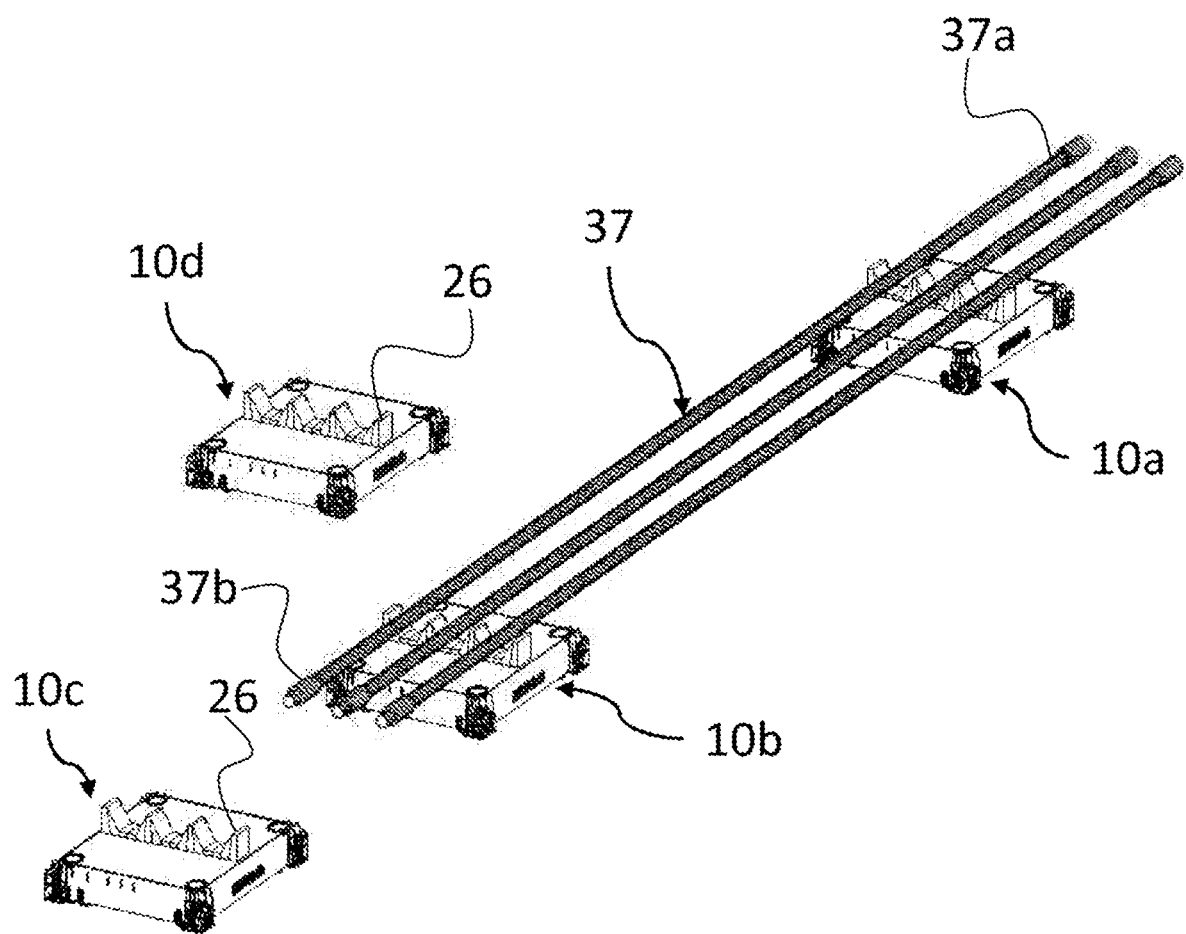
FIG. 5 is a perspective illustration of a plurality of utility vehicles being used to transport sections of drill pipe.

Two utility vehicles 10 equipped with the cradles 26 described above may alternatively be used together in place of a tubular running machine. This is illustrated in FIGS. 3 and 5, and in this case, a first end 37a of the elongate element 37 is supported on a first utility vehicle 10a, and an opposite second end 37b of the elongate element 37 is supported on a separate second utility vehicle 10b so that a longitudinal axis of the elongate element 37 is generally parallel to the rig floor 16. The first and second utility vehicles 10a, 10b are moved over the rig floor 16 in unison to transport the elongate element 37 to a desired position on the rig floor 16, at which point the first utility vehicle 10a is located in a first end position 16a and the second utility vehicle 10b is in a second end position 16b. An elevator apparatus such as a crane 40 mounted on the derrick 42 may then be attached to the first end 37a of the elongate element 37, and operated to lift the first end 37a of the elongate element 37 vertically off the first utility vehicle 10a, whilst simultaneously moving the second utility vehicle 10b from the second end position 16b towards the first end position 16a, the second end 37b of the elongate element 37 still being supported by the second utility vehicle 10b, in order to move the elongate element 37 towards an upright position in which its longitudinal axis extends generally perpendicular to the rig floor 16. Once the second utility vehicle 10b is in or is close to the first end position 16b, the elevator apparatus 40 may be operated to lift the elongate element 37 off the second utility vehicle 10b, before lowering the now generally vertical elongate element 37 into its desired position.

This procedure may, for example, be used to add a new section of drill pipe onto a drill string, or a new riser section onto a riser string.

As soon as the first end 37a of the elongate element 37 has been lifted off the first utility vehicle 10a, the first utility vehicle 10a is advantageously moved away from the first end position 16b, and can be moved back to the supply of elongate elements 37 whilst the original elongate element 37 is still being lifted into its vertical position, so that it can be loaded with a first end 37a of another elongate element 37 whilst the second utility vehicle 10b is returning. Where the apparatus is being used to add new tubular to a tubular string, the speed of the process may thus be increased.

If a third and fourth utility vehicle 10c, 10d are used, these can be loaded with a second elongate element 37 whilst the first and second utility vehicle 10b are transporting the first elongate element 37, and the first and second utility vehicles 10a, 10b loaded with a third elongate element 37 whilst the third and fourth utility vehicles 10c, 10d are transporting the second elongate element 37 etc. The supply of new tubulars can thereby be continuous or virtually continuous.

The utility vehicle 10 described above can be used on any sort of drilling rig, i.e., on-shore, off-shore, fixed or floating.

In the prior art rail mounted skids, the rails may provide means for securing the vehicle to the rig floor, and preventing it from tipping over if the center of gravity of the vehicle moves outside its base as a result of the operation of equipment mounted on the vehicle, or, where used on a floating drilling rig, if the rig floor on a floating drilling rig tilts a result of ocean swell. The risk of the vehicle tipping over may be particularly severe during use of equipment including an extendible arm such as a pipe handler or crane, which may be required to lift heavy objects. This risk may exist both for free-moving vehicles, such as those described above, and vehicles operating on e.g., rails or tracks on the drill floor.

Operators may anticipate that the weather conditions and/or operating conditions of the equipment mounted on the utility vehicle 10 mean that there is an increased likelihood of the utility vehicle 10 being subjected to forces which are likely to make it tip, and can take pre-emptive precautions to prevent this. For example, the base 20 of the utility vehicle 10 may be provided with anchor formations via which an operator may secure the base 20 to the base 20 of one of more additional utility vehicles 10, thus effectively increasing the area of the base 20 of the utility vehicle 10.

Alternatively, or additionally anchor points may be provided at appropriate positions in the rig floor 16, and the operators may use the anchor formations to mechanically tether the base 20 of the utility vehicle 10 to the anchor point.

The utility vehicle 10 may equally be secured to such an anchor point or anchor points to help transfer forces from equipment into a fixed structure, as required for operation of equipment, such as a low guarding arm or iron roughneck.

Figure 6:
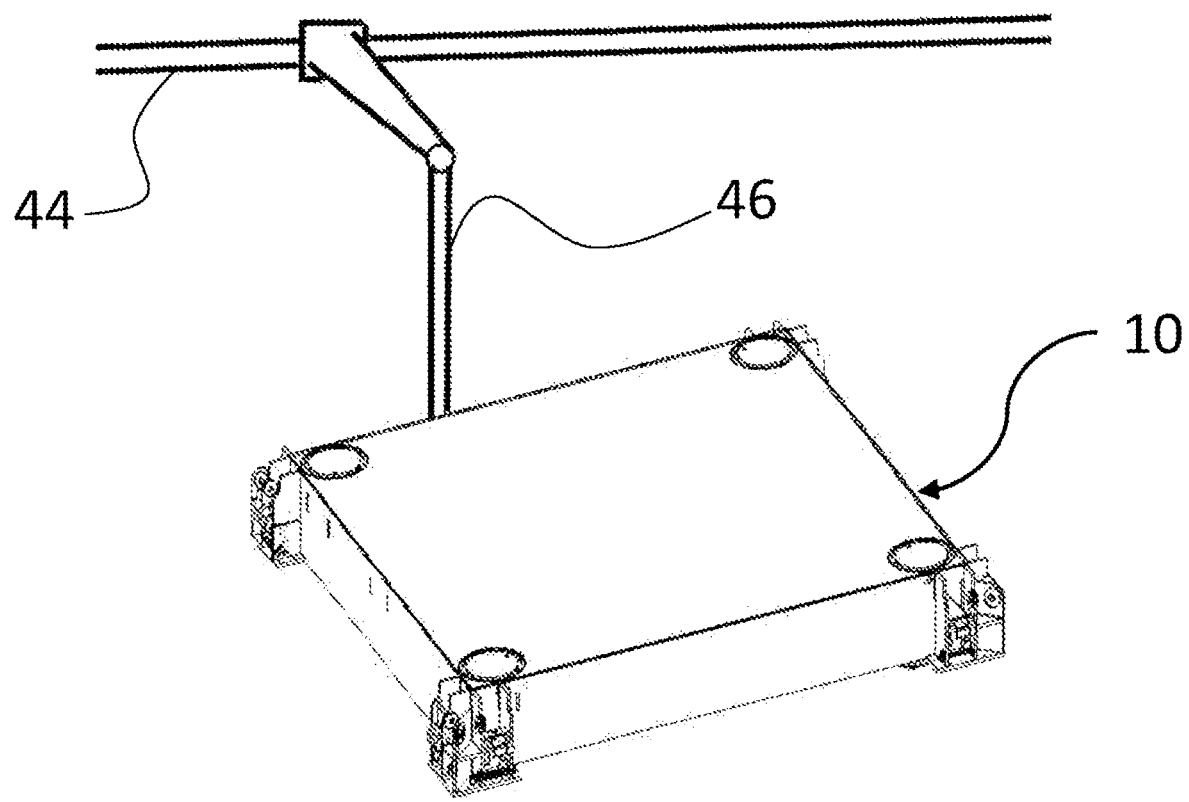
FIG. 6 is a perspective illustration of a utility vehicle connected to an anchor rail using an anchor arm.

Such anchor points would advantageously be provided at locations where equipment with a long reach which is likely to be used to lift or guide heavy objects is likely to be operated, for example, on the pipe deck or drill floor. Such equipment could be a drill flow manipulator arm, a tubular feeding machine, or a low guiding arm. The anchor point may, for example, be provided on a suspended rail 44 to which the utility vehicle 10 is secured with a running bracket or an adjustable arm 46, as illustrated in FIG. 6.

Figure 7:
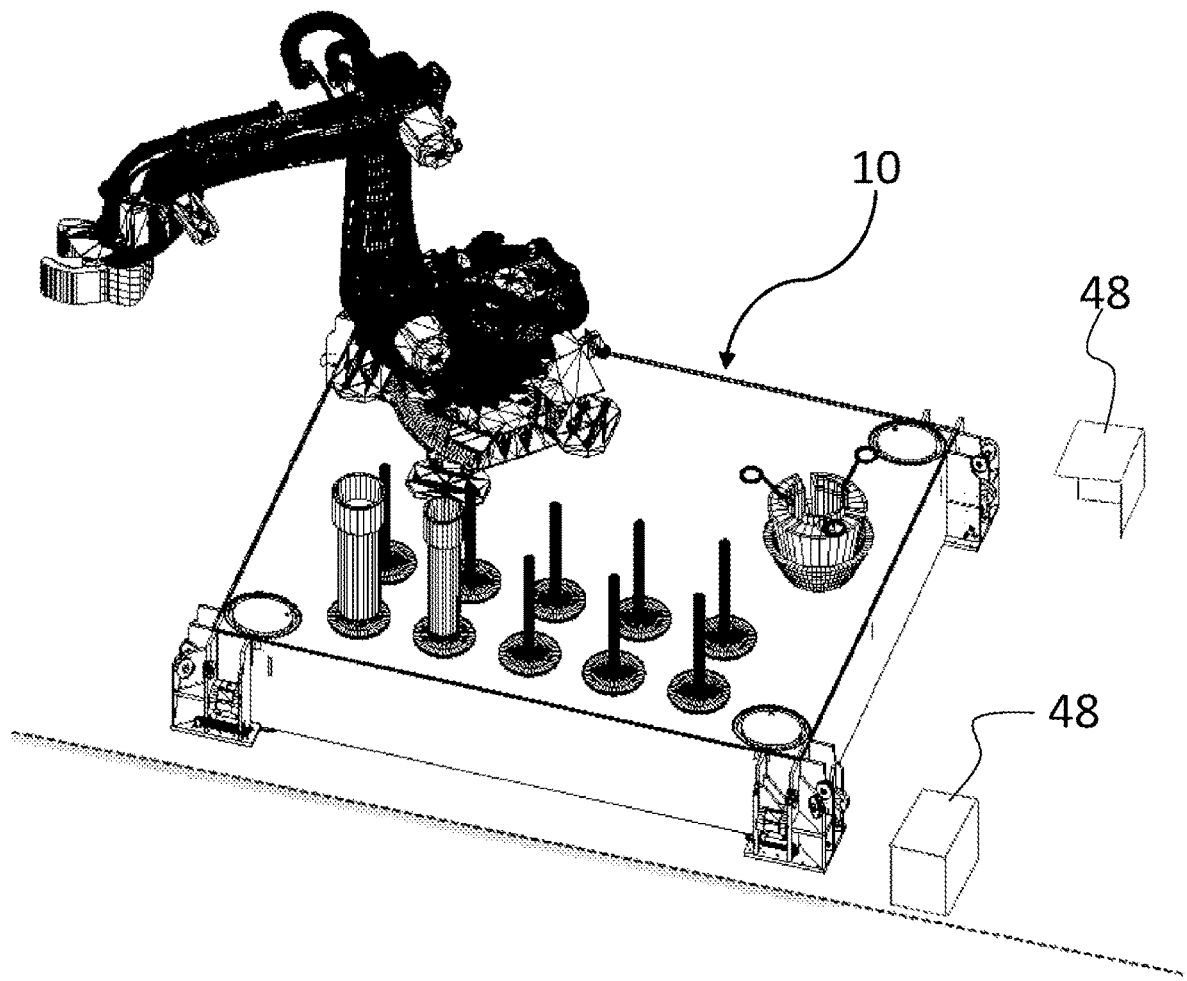
FIG. 7 is a perspective illustration of a utility vehicle and anchor boxes.

An alternative embodiment of anchor mechanism is illustrated in FIG. 7. In this case, two three-sided boxes 48 are secured to the rig floor 16. These have a top which is generally parallel to the rig floor 16, and which is slightly higher than the top of the base 20 of the utility vehicle 10, and are spaced apart by a distance which is slightly greater than the length of a side of the base 20 of the utility vehicle 10. The utility vehicle 10 may thus be driven into the boxes 48 so that two corners of the base 20 are enclosed by the boxes 48; the two corners ideally most likely to lift due to the operation of equipment mounted on the utility vehicle 10, thus preventing the utility vehicle 10 from tipping.

Figure 8:
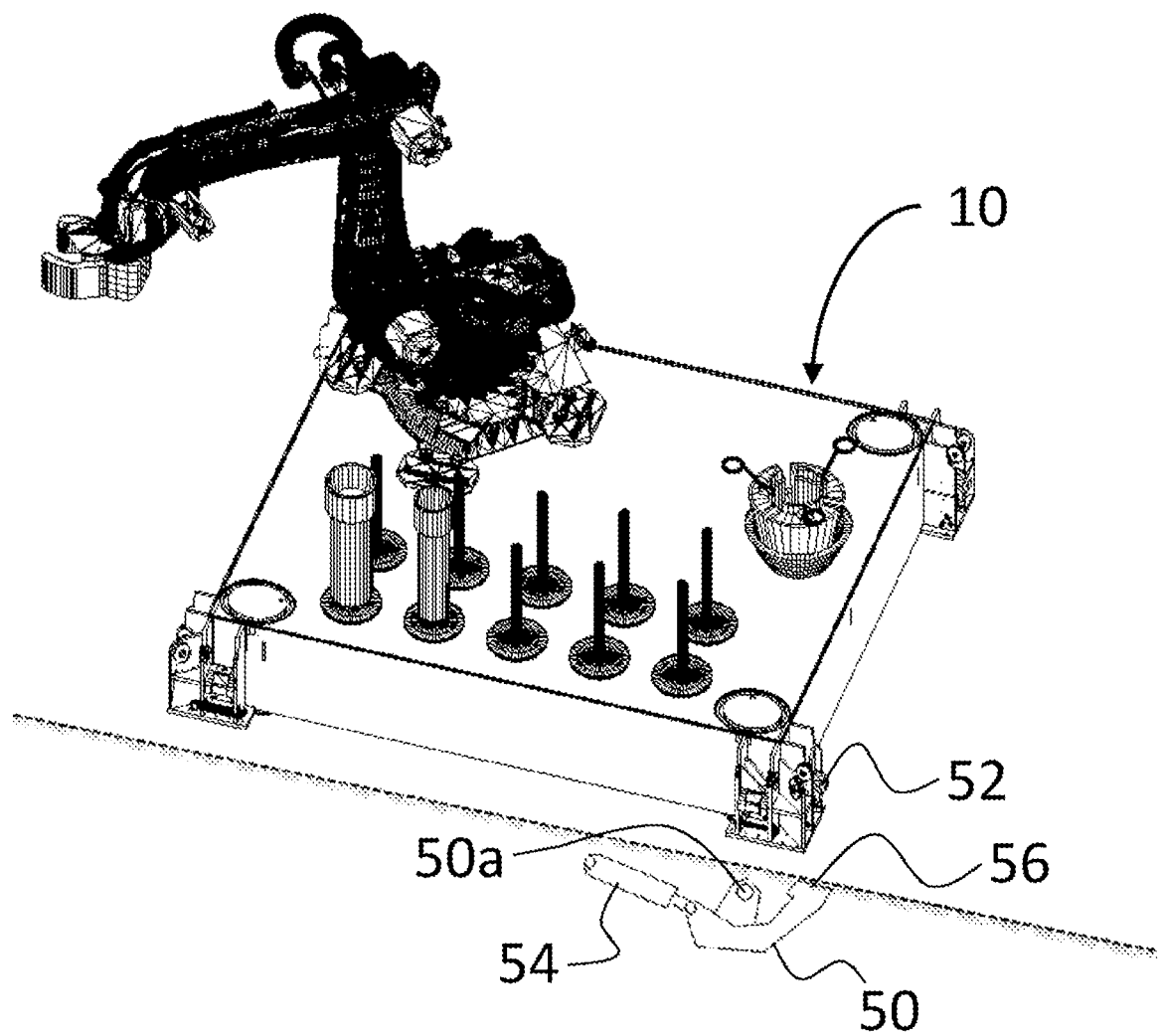
FIG. 8 is a perspective illustration of a utility vehicle on a floor with an anchor arm, the anchor arm being in the retracted position.
Figure 9:
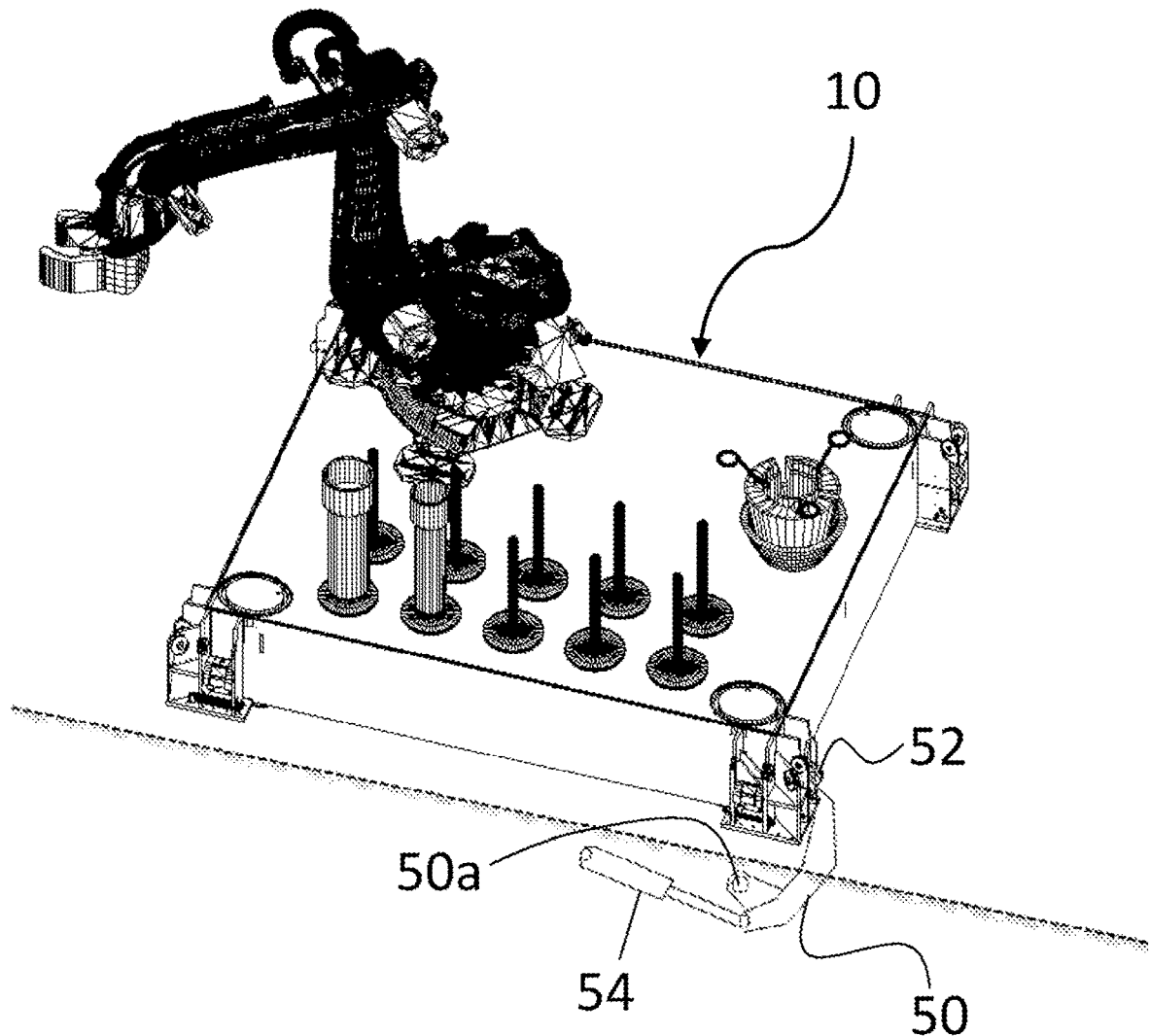
FIG. 9 is a perspective illustration of the utility vehicle shown in FIG. 8 anchored to the floor with the anchor arm.

A further alternative embodiment of anchor mechanism is illustrated in FIGS. 8 and 9. In this case, an adjustable arm 50 is mounted on the rig floor 16 and is operated to engage with an anchor formation 52 on the base 20 of the utility vehicle 10. The anchor formation 52 may, for example, comprise a bar, hook or loop.

The adjustable arm 50 is pivotally connected to the rig floor 16 at pivot point 50*a*, and a first end of the adjustable arm 50 is connected to the piston rod of a piston and cylinder arrangement 54 which is also pivotally mounted on the rig floor 16. An engagement formation such as a hook or clamp 56 is provided at the other end of the adjustable arm 50. When the piston is in its retracted position, as illustrated in FIG. 8, the adjustable arm 50 and piston and cylinder arrangement 54 are located beneath the upper surface of the rig floor 16 so as not to impede the movement of the utility vehicle 10 across the rig floor 16

The piston and cylinder arrangement 54 is connected to supply a pressurized fluid such as compressed air or hydraulic fluid, and when supplied with pressurized fluid, the piston moves out of the cylinder, causing the adjustable arm 50 to pivot about the pivot point 50*a*, and the engagement formation 56 to rise above the uppermost surface of the rig floor 16, where it may engage with the anchor formation 52 of an appropriately positioned utility vehicle 10, to anchor the base 20 of the utility vehicle 10 to the rig floor 16, as illustrated in FIG. 9.

In an embodiment of the present invention, the utility vehicle 10 is provided with an anti-lift controller which includes at least one electronic sensor which is configured to detect pitch, roll and acceleration of the utility vehicle 10. Such a sensor could be an accelerometer, an inclinometer, a motion reference unit, an inertial measurement unit, a GPS sensor, or an inertial measurement unit (IMU) sensor. A combination of any of these sensors could equally be used.

The anti-lift controller is programmed with a pre-determined threshold level for the pitch, roll and/or acceleration of the utility vehicle 10.

The anti-lift controller may also be connected to load sensors which measure the load at various points across the base 20, and to use the signals received from these sensors to determine the load distribution over the base 20. Additionally or alternatively, if the drilling rig 18 is provided with its own stability control system (including sensors which measure the pitch, roll and acceleration of the drilling rig), or wind speed sensors, the anti-lift controller may be programmed to receive data concerning the wind speed, and/or pitch, roll and acceleration of the drilling rig sent wirelessly from the drilling rig stability control system to a wireless signal receiver on the utility vehicle 10. The anti-lift controller may in this case be programmed to use this additional information (load distribution, wind speed, drilling rig pitch, roll and acceleration data) to re-evaluate the threshold level continuously, or at least at regular intervals, during the operation of the utility vehicle 10.

The anti-lift controller may be programmed to issue a visible and/or audible alert if it detects pitch, roll or acceleration of the utility vehicle 10 above the threshold level, thus prompting an operator to carry out the preventative measures described above.

The anti-lift controller may be programmed to operate a lift preventer system if it detects pitch, roll or acceleration of the utility vehicle 10 above the threshold level.

The lift preventer system may comprise operating the anchor mechanisms described above in relation to FIG. 6, 7, 8 or 9. The lift preventer system may alternatively comprise an electromagnet which is mounted on the underside of the base 20 of the utility vehicle 10, the anti-lift controller being programmed to increase the flow of electrical power to the electromagnet if the pitch, roll or acceleration of the utility vehicle 10 exceeds the threshold level, so that the electromagnet is attracted to ferromagnetic portions of the rig floor 16, thus anchoring the utility vehicle to the rig floor 16.

The lift preventer system may alternatively or additionally comprise anti-lift arms, the anti-lift controller being programmed to extend these arms from the base 20 in a direction generally parallel to the plane of the base 20 if it detects pitch, roll or acceleration above the threshold level. The anti-lift arms may be extended via a connection to the drive apparatus 14, or by alternative means such as separate electrically, pneumatically or hydraulically driven actuators.

The lift preventer system may alternatively or additionally comprise a counterweight balancing system which is mounted on a utility vehicle, the anti-lift controller being programmed to operate the counterweight balancing system to counteract the forces causing pitch, roll or acceleration of the utility vehicle 10 above the threshold level. The counterweight balancing system could, for example, comprise an arm which has a weight mounted at an end thereof, and which is operable to move the weight relative to the base 20. As with the anti-lift arms, the counterweight balancing arm may be extended via a connection to the drive apparatus 14, or by alternative means such as separate electrically, pneumatically or hydraulically driven actuators.

The anti-lift controller may alternatively or additionally be connected to an electronic equipment controller which controls the operation of the equipment on the utility vehicle 29, and if it detects pitch, roll or acceleration of the utility vehicle 10, instruct or limit the equipment controller to control the equipment in such a way as to lower the center of gravity of the utility vehicle 10 and/or return the center of gravity to a point over the base 20. For example, if the utility vehicle 10 is close to tipping because an arm loaded with a heavy object has extended to high and too far laterally from the base 20, the anti-lift controller may instruct the equipment controller to retract the arm to return the heavy object to a point closer to the base 20.

Whilst in the embodiments of the present invention described above, the direction of travel of the utility vehicle 10 is changed by pivoting the wheel axes about pivot axes which are generally perpendicular to the plane of the rig floor 16, this need not be the case, and this may be achieved in other ways. For example, the wheel axes of the driven wheels 12 may be fixed, and, instead, the drive apparatus 14 configured to drive one or more driven wheel 12 or set of wheels 12 on one side of the base 20 independently of one or more driven wheel 12 or set of wheels 12 on an opposite side of the base 20. In this way, the direction of travel of the utility vehicle 10 may changed by driving the wheel 12 or wheels 12 on the one side of the base 20 in a clockwise direction, whilst either driving, or allowing to rotate freely, the wheel 12 or wheels 12 on the other side of the base 20 in an anti-clockwise direction, or simply driving the wheels 12 on one side of the base 20 at a faster speed than the wheels 12 on the other side of the base 20. Once the utility vehicle 10 is oriented in the correct direction, the drive apparatus 14 can then be operated to rotate all the driven wheels 12 in the same direction, and at the same speed, in order to move the utility vehicle 10 forwards in a straight line.

As a further alternative, the utility vehicle 10 may utilize omni-directional wheels 12, such as the mecanum wheels described in U.S. Pat. No. 3,876,255. A mecanum wheel is a conventional wheel with a series of rollers attached to its circumference. These rollers typically each have an axis of rotation at 45° to the plane of the wheel and at 45° to a line through the center of the roller parallel to the axis of rotation of the wheel. By alternating wheels with left and right-handed rollers so that each wheel applies force roughly at right angles to the wheelbase diagonal the wheel is on, the utility vehicle 10 is stable and can be made to move in any direction and to turn by varying the speed and direction of rotation of each wheel 12. Such wheels are, for example, used in the omniMove™ drive system of KUKA Roboter GmbH.

In this system, each wheel 12 consists of two annular rims, which are mutually parallel and rotatable about a wheel axis which extends generally perpendicular to the rims, and up to nine free-running rollers, which are mounted between and around the entire circumference of the rims at a 45° angle to the wheel axis. The wheel axes of all the wheels 12 on the utility vehicle 10 are fixed mutually parallel. The wheels 12 are driven by an electric motor, and move independently of each other, thus enabling the utility vehicle 10 to move in any direction from a standing start, and achieving full 360° freedom of movement.

For example, the utility vehicle 10 travels in a forwards or backwards direction by rotating all wheels 12 at the same speed and in the same direction, but can move sideways by all wheels 12 at the same speed, but one pair of rotating diagonally opposite wheels 12 in a first direction, and the other pair of diagonally opposite wheels 12 in the opposite direction. It can also move diagonally, by rotating the wheels 12 in the same direction but at different speeds. The utility vehicle 10 can also turn on the spot by rotating the wheels 12 on one side of the utility vehicle 10 in a first direction, and the wheels 12 on the opposite side of the utility vehicle 10 in the opposite direction. Combinations of these wheel motions allow for utility vehicle 10 motion in any direction with any vehicle rotation (including no rotation at all).

The utility vehicle 10 could equally be configured to move on a plurality of tracks such as those used on excavators.

Where a pipe handler 28 is mounted on the utility vehicle 10, there may be provided a pipe alignment controller, for use in controlling movement of the utility vehicle 10 and/or pipe handler 28 so that the end of the pipe lifted by the pipe handler 28 is correctly aligned with (typically, positioned directly above) the end of the pipe on which the lifted pipe is to be mounted (referred to as the stickup), before the lifted pipe is lowered onto the stickup.

The pipe alignment controller is connected to a sensor which detects the position, in three dimensions, of both the stickup and the lifted pipe end, and communicates with the drive controller of the utility vehicle 10 so that the drive controller controls the drive apparatus 14 to move the utility vehicle 10 to a position in which the stickup and lifted pipe end are correctly aligned.

The sensor may comprise a lidar, radar or camera system.

The sensor may be mounted on the utility vehicle 10 and directed towards the lifted pipe end. The sensor may alternatively be mounted on a fixed structure on the rig floor, ideally close to or adjacent the stickup, and directed to towards the stickup.

The pipe alignment controller may be programmed to provide a visual or audible signal to an operator when the lifted pipe end and stickup are aligned. The pipe alignment controller may alternatively or additionally communicate with a pipe handler controller to prevent operation of the pipe handler to lower the lifted pipe until the pipe alignment controller has determined that the stickup and lifted pipe end are correctly aligned, or to facilitate the automatic operation of the pipe handler to connect the lifted pipe with the stickup.

Whilst in this embodiment, the alignment controller is described in relation to a pipe handler mounted on a utility vehicle according to the first aspect of the present invention, the alignment controller could of course be used in conjunction with a pipe handler mounted on any other form of utility vehicle 10, including, for example, the skid described in US 2017/0321490. It could also be used in conjunction with a pipe handler which is not mounted on a utility vehicle 10. Movement of the lifted pipe to bring it into alignment with the stickup would in this case have to be achieved only through the movement of the pipe handler arm.

The present invention is not limited to embodiments described herein; reference should be had to the appended claims.

LIST OF REFERENCE NUMERALS

10 Utility vehicle
10a First utility vehicle
10b Second utility vehicle
10c Third utility vehicle
10d Fourth utility vehicle
12 Wheel/wheels
14 Drive apparatus
16 Rig floor
16a First end position
16b Second end position
18 Drilling rig
20 Base
22 Battery
24 Poles/rods
25 Tubular item/sub/pipe
26 Cradle
28 Pump handler
30 Articulated arm
32 Grabber
34 Deck Washer
36 Tank
37 Elongate element
37a First end of elongate element
37b Second end of elongate element
38 Brush
40 Elevator apparatus/crane
42 Derrick
44 Suspended rail
46 Adjustable arm
48 Box
50 Adjustable arm
50a Pivot point
52 Anchor formation
54 Piston and cylinder arrangement
56 Engagement formation/hook or clamp

What is claimed is:

1. A drilling rig system comprising:
a drilling rig comprising a floor which is generally planar; and
a utility vehicle comprising a base, a drive apparatus, and a ground engaging motive apparatus upon which the base is supported on the floor, the drive apparatus being configured to drive the ground engaging motive apparatus so as to move the utility vehicle across the floor, wherein,
the base of the utility vehicle comprises a generally planar uppermost surface which is configured so that at least one of racks, poles, rods, a holding structure, a U-shaped cradle, and a support structure which is/are respectively configured to hold a plurality of tubular items is mountable on the generally planer uppermost surface of the base,
a powered apparatus is mounted on the base, the powered apparatus comprising a movable articulated arm which is configured to handle the plurality of tubular items held by the at least one of the racks, the poles, the rods, the holding structure, the U-shaped cradle, and the support structure which is/are respectively mountable on the generally planer uppermost surface of the base, and
the ground engaging motive apparatus is configured to be drivable so as to change a direction of travel of the utility vehicle at any point on the floor.

2. The drilling rig system as recited in claim 1, wherein,
the utility vehicle further comprises a wireless control signal receiver via which wireless control signals are receivable by the utility vehicle from a remote controller, and
the wireless control signals control an operation of the drive apparatus.

3. The drilling rig system as recited in claim 1, wherein,
the utility vehicle further comprises wheels,
the base of the utility vehicle comprises four sides, each side of the four sides being generally perpendicular to an adjacent side of the four sides so as to form four corners, and
each of the four corners has a corresponding one of the wheels arranged thereat.

4. The drilling rig system as recited in claim 1, wherein the base of the utility vehicle comprises at least one anchor formation via which the base of the utility vehicle is securable to a base of at least one additional utility vehicle by an operator.

5. The drilling rig system as recited in claim 1, further comprising:
a lift preventer system,
wherein,
the utility vehicle further comprises an anti-lift controller which comprises at least one electronic sensor which is configured to detect at least one of a pitch, a roll and an acceleration of the utility vehicle and which is programmed with a pre-determined threshold level for at least one of the pitch, the roll and the acceleration, and
the anti-lift controller is programmed to operate the lift preventer system if it detects the pitch, the roll or the acceleration of the utility vehicle above the threshold level.

6. The drilling rig system as recited in claim 5, wherein,
the utility vehicle further comprises a plurality of load sensors each of which is configured to measure a load at a point on the base, and
the anti-lift controller is connected to the plurality of load sensors and is further programmed to use signals received from the load sensors to determine a distribution of the load over the base.

7. The drilling rig system as recited in claim 5, wherein,
the drilling rig further comprises a stability control system which comprises means to alter a pitch or a roll of the drilling rig,
the anti-lift controller is connected to a wireless signal transmitter, and
the anti-lift controller is further programmed to use the wireless signal transmitter to transmit control signals to the stability control system of the drilling rig so that the stability control system reduces a tilting of the floor.

8. A method of using the drilling rig system as recited in claim 1 to move an elongate object over the floor, the method comprising:
providing the elongate element comprising a first end and a second end, the first end being opposite to the second end;
providing a first utility vehicle and a second utility vehicle, the first utility vehicle being separate from the second utility vehicle;
supporting the first end of the elongate element on the first utility vehicle and the second end of the elongate element on the second utility vehicle so that a longitudinal axis of the elongate element is generally parallel to the floor; and
moving the first utility vehicle and the second utility vehicle over the floor in unison so as to transport the elongate element to a desired position on the floor and so that the first utility vehicle is located in a first end position and the second utility vehicle is in a second end position.

9. The method as recited in claim 8, wherein, when the elongate element has reached the desired position on the floor, the method further comprises:
providing an elevator apparatus; and
using the elevator apparatus to lift the first end of the elongate element off the first utility vehicle and, simultaneously therewith, moving the second utility vehicle from the second end position towards the first end position, the second end of the elongate element still being supported by the second utility vehicle, thereby moving the elongate element towards an upright position in which the longitudinal axis of the elongate element extends generally perpendicular to the floor.

10. The method as recited in claim 9, further comprising:
moving the first utility vehicle away from the first end position once the first end of the elongate element is no longer supported on the first utility vehicle.

11. The method as recited in claim 10, further comprising:
moving the second utility vehicle into the first end position; and then
using the elevator apparatus to lift the elongate element off the second utility vehicle.

12. A drilling rig system comprising:
a drilling rig comprising a floor which is generally planar;
a utility vehicle comprising a base, a drive apparatus, and a ground engaging motive apparatus upon which the base is supported on the floor, the drive apparatus being configured to drive the ground engaging motive apparatus so as to move the utility vehicle across the floor;
a powered apparatus which is mounted on the base of the utility vehicle, the powered apparatus comprising a movable articulated arm, and
an anchor, wherein,
the floor of the drilling rig comprises at least one anchor point,
the base of the utility vehicle comprises at least one anchor formation, and
the anchor is configured to extend between the at least one anchor point on the floor of the drilling rig and the at least one anchor formation on the base of the utility vehicle so as to rigidly anchor the base of the utility vehicle to the floor of the drilling rig so that the base of the utility vehicle is immovable relative to the floor of the drilling rig.

13. The drilling rig system as recited in claim 12, wherein the ground engaging motive apparatus is configured to be drivable so as to change a direction of travel of the utility vehicle at any point on the floor.

14. The drilling rig system as recited in claim 12, wherein the ground engaging motive apparatus is configured to drive along predefined rails or tracks on the floor.

* * * * *